United States Patent [19]

Achorn

[11] 4,434,279
[45] Feb. 28, 1984

[54] HIGH SWELL RESINS

[75] Inventor: George S. Achorn, West Chester, Pa.

[73] Assignee: Atlantic Richfield Company, Los Angeles, Calif.

[21] Appl. No.: 403,601

[22] Filed: Aug. 2, 1982

[51] Int. Cl.$^3$ .............................................. C08F 2/38
[52] U.S. Cl. ...................................... 526/66; 525/53; 525/247; 526/71; 526/352
[58] Field of Search ................... 525/247, 53; 526/71, 526/66

[56] References Cited

U.S. PATENT DOCUMENTS

| | | | |
|---|---|---|---|
| 3,051,690 | 8/1962 | Vandenberg | 526/151 |
| 3,392,213 | 7/1968 | Berger | 526/65 |
| 4,136,058 | 1/1979 | Harris et al. | 526/127 |
| 4,357,448 | 11/1982 | Tsubaki et al. | 526/66 |
| 4,368,291 | 1/1983 | Frese et al. | 525/53 |

Primary Examiner—Stanford M. Levin
Attorney, Agent, or Firm—Lewis J. Young

[57] ABSTRACT

Live polyethylene slurry is treated with small amounts of ethylene in the absence of hydrogen, for example in the drier. By using this procedure it is possible to prepare polymers with very high, controllable levels of swell. In contrast to previous procedures reported for dual stage polymerizations, the melt flow ratios are not appreciably altered.

2 Claims, No Drawings

HIGH SWELL RESINS

BACKGROUND OF THE INVENTION

The present invention relates to a method of preparing high swell resins during the polymerization of ethylene to high density polyethylene with high efficiency Ziegler catalysts.

High swell resins are used primarily in blow molding applications, where the increase in parison diameter after leaving the die can be critical in respect to properly filling the mold and getting the desired bottle weight.

It has been difficult to prepare high swell resins by usual polymerization procedures. As pointed out by Schreiber (J. Appl. Pol. Sci 9 887 [1965]), just broadening molecular weight distribution (MWD) is not adequate to increase swell appreciably; a relatively small amount of very long chains must be introduced. If these are long enough to crystallize in two different domains, they form a lightly crosslinked, elastically deformable network which contributes to increased swell.

One approach has been to incorporate a small amount of high molecular weight polymer by melt blending. However, it is difficult to obtain the degree of dispersion which is necessary for high swell. In addition, melt blending requires high energy input and tends to degrade the polymer, particularly the high molecular weight fraction.

Berger, in U.S. Pat. No. 3,392,213 teaches to make bimodal polyethylene by polymerizing ethylene in a two-zone reactor wherein hydrogen is used to control molecular weight in the first zone and a higher molecular weight is formed in the second zone by reducing the amount of hydrogen therein. The separate zones are, for practical reasons, separate reactors.

SUMMARY OF THE INVENTION

It has now been found that the need for mechanically melt blending or the use of two-reactor systems can be eliminated by polymerizing a high molecular weight fraction, intimately mixed with the previously-polymerized base polymer.

A very high molecular weight fraction is added to an already-polymerized high density polyethylene by contacting the polymer, after its separation from the original monomer-chain transfer agent mixture, and before the catalyst is deactivated, with additional ethylene. This essentially molecularly dispersed fraction contributes a high degree of swell to the base polymer.

DETAILED DESCRIPTION OF THE INVENTION

The present invention relates to the polymerization of ethylene in the presence of catalysts known in the art as second generation Ziegler catalysts.

Ziegler catalysts are commonly formed by reducing a transition metal compound with an organometallic compound. The reduced transition metal compound is then used, in conjunction with an activator, which may be the same or a different organometallic compound, to polymerize ethylene in the presence of an inert solvent. A molecular weight regulator, such as hydrogen, may be used with those catalyst systems, as taught by Vandenberg in U.S. Pat. No. 3,051,690.

So-called first generation Ziegler catalysts produced polyethylene at the relatively low efficiency of 500–7000 grams of polyethylene per gram of transition metal in the catalyst. Because of the low efficiency of the catalyst, the resulting polymer had to be specially treated to remove the catalyst residues.

With the advent of the second generation Ziegler catalysts, the catalyst efficiency is greater than 70,000 grams of polyethylene per gram of transition metal. The catalyst residues are thus minor impurities in the polymers and need not be removed.

With these new, high activity, Ziegler type catalysts there is no catalyst removal step, and in a poison-free system the catalyst remains active until it is exposed to the oxygen and moisture present in the atmosphere. It is therefore possible, in a slurry process, to add ethylene to the inert gas in the drier system and polymerize a small amount of very high molecular weight polymer, since there is no chain transfer agent (usually hydrogen) present at this point in the process. Because the active catalyst particles are randomly distributed within the already formed polymer particles, this high molecular weight fraction is almost molecularly dispersed; a condition essential for optimum enhancement of swell.

The invention can be practiced with any type of polymerization which employs a high-activity catalyst (gas-phase, solution or slurry). However, it is particularly suited for the slurry process since no additional process steps or time are required, and the heat of polymerization of the high molecular weight fraction reduces the amount of heat which would normally have to be supplied to the drier.

With low-efficiency catalysts the polymerization is run in a reactor by charging catalysts, activator-scavenger, and solvent to the reactor. Ethylene and hydrogen are pressured into the reactor and the polymerization carried out. The excess gases are then vented and an alcohol is added to kill the catalyst which is then removed by washing. The polymer is then placed in a drier to remove all solvents. With high-efficiency catalysts, the gases are vented and the polyethylene with catalyst residues intact is filtered from the solvent and then placed in a drier to remove the last of the solvents.

The present invention involves contacting the polymer with catalyst residues intact in the drier, after filtering from the solvent, with additional ethylene in the absence of hydrogen to form a high-molecular weight fraction of polyethylene which is intimately mixed into the initial polyethylene. No additional reactor is used. The heat of polymerization of this portion of the ethylene serves the additional purpose of helping to dry the polymer in the drier.

The slurry polymerization involves the use of an inert hydrocarbon diluent (above referred to as "solvent"). Suitable inert hydrocarbons are the paraffinic and cycloparaffinic hydrocarbons having from 5 to 10 carbon atoms, such as pentane, isopentane, hexane, heptane, octane, decane, cyclopentane, cyclohexane, methylcyclohexane and aromatic hydrocarbons, such as benzene, xylene, toluene and the like. The choice of hydrocarbon may vary with the olefin to be polymerized. The use of hydrocarbons of 6 to 10 carbon atoms will reduce the pressure required for the reaction and may be preferred for safety and equipment cost considerations.

Although any of the known high-efficiency, second-generation Ziegler catalysts are suitable for the instant polymerization, the following examples were carried out using the catalyst system described in U.S. Pat. No. 4,136,058, which patent is hereby incorporated in its entirety herein. The catalyst was prepared by reacting an organomagnesium compound with tetrabutyltitanate followed by deactivation of excess magnesium compound with anhydrous hydrogen chloride. The activator-scavenger used with this catalyst was diisobutylaluminum hydride.

The following examples illustrate, but are not meant to limit the present invention.

EXAMPLE I

To a one gallon, dried, nitrogen-flushed, stirred autoclave was added 2 liters of dried n-hexane as solvent and 2.5 millimoles of diisobutylaluminum hydride as activator-scavenger. The solution was stirred for 5 minutes to allow for equilibration and for scavenging of impurities. Then 1.5 ml. (containing 0.1 millimoles of titanium) of catalyst made from tetrabutyltitanate, dihexylmagnesium, and hydrogen chloride in hexane, was transferred to the autoclave via a syringe through a nitrogen-flushed port. The autoclave was sealed, heated to 50° C., pressured to 20 psig with hydrogen and then to 50 psig with ethylene. The polymerization temperature was adjusted to 85° C. and the reaction allowed to proceed for one hour. The mixture was then cooled. The reactor was then vented of unreacted ethylene and hydrogen and a sample of the slurry was removed. The sample was filtered and the polymer powder dried in a vacuum oven. The remainder of the slurry, still protected from the atmosphere, was transferred to a clean, dry, fritted-glass filter and the liquid portion removed. The still damp filter cake was then blown with ethylene for a half hour, after which the polymer was removed and dried. Both polymer samples were then tested for melt index (MI) at 190° C. with both 10 Kg ($MI_{10}$) and 2160 g ($MI_2$) weights (ASTM Procedure D1238-65T). In addition the average diameters of the cooled MI strands were measured with a micrometer. Percentage strand swell was calculated from these diameters using the formula:

$$\% \text{ swell} = \frac{Ds - Do}{Do} \times 100,$$

where Ds=the diameter of the cooled strand, and Do=the diameter of the melt indexer orifice The sample taken before post treatment with ethylene had an $MI_2$ of 12.9, $MI_{10}/MI_2$ ratio of 9.6 and an $MI_{10}$ swell of 157%. The corresponding figures for the post treated polymer were 10.6, 9.8 and 209%. Thus there was a small drop in $MI_2$, little or no broadening of molecular weight distribution (MWD) as indicated by $MI_{10}/MI_2$ ratio, but a 33% increase in $MI_{10}$ strand swell, brought about by the post treatment.

EXAMPLE II

Another experiment carried out in the same way as Example I, but producing a higher melt index product, gave polymer with an $MI_2$ of 85 and an $MI_2$ swell of 55% before post treatment, and with an $MI_2$ of 52 and an $MI_2$ swell of 183% after post treatment with ethylene. The molecular weights of these samples were both too low to permit determining $MI_{10}$'s.

EXAMPLE III

A third experiment was carried out using the same catalyst, hydrogen level and polymerization time as Example I, but doubling the time of exposure to ethylene on the filter (post treatment time) to one hour.

The polymer before post treatment had an $MI_2$ of 62 and $MI_2$ swell of 41%. After the post treatment with ethylene, the $MI_2$ was 14.4, the $MI_2$ swell, 173%, the $MI_{10}/MI_2$ ratio, 9.4 and the $MI_{10}$ swell, 258%.

A gel-permeation chromatograph of these two polymers showed that the post-treatment added a little less than 2.5% of high molecular weight polyethylene (400,000–3,000,000 MW). Otherwise the curves were identical (peak molecular weight at 50,000). Thus, a small amount of high molecular weight polymer, thoroughly dispersed, can have a significant effect on polymer swell.

EXAMPLE IV

In this experiment only 18 psig of hydrogen (vs. 20) was used and the initial polymerization was halted after one-half hour (vs. one hour) in order that a more active catalyst be available during the post treatment with ethylene. The result was a very high $MI_{10}$ swell, after post treatment, of 295%. The melt ratio was 9.3.

We claim:

1. In a process comprising (a) polymerizing ethylene in slurry of inert hydrocarbon diluent in the presence of a Ziegler catalyst, having an efficiency of greater than 70,000 grams polyethylene per gram of transition metal in the catalyst, and hydrogen as a molecular weight regulator; (b) venting of ethylene and hydrogen; (c) filtering the resulting polyethylene with active catalyst residues from diluent; and (d) drying said polymer to eliminate traces of diluent; the improvement comprising polymerizing additional ethylene in the presence of filtered polymer from step (c), above, and containing still active catalyst residues but in the absence of hydrogen and then drying the polymer; whereby a polyethylene having an intimate mixture of higher molecular weight polyethylene therein and having a resulting increase in percent swell is formed.

2. A method of making high swell polyethylene resin comprising (a) polymerizing ethylene in the presence of a Ziegler catalyst, having an efficiency of greater than 70,000 grams polyethylene per gram of transition metal in the catalyst, and hydrogen as molecular weight regulator in an inert hydrocarbon diluent; (b) venting ethylene and hydrogen without deactivating catalyst residues; (c) separating polyethylene with catalyst residues from the diluent by filtration to form a filter cake; (d) contacting said filter cake with additional ethylene at room temperature to produce higher molecular weight polyethylene intimately dispersed throughout the polyethylene from step (c), above; and (e) drying the polyethylene from step (d) to remove the traces of diluent.

* * * * *